Oct. 23, 1962  R. DELL HULL  3,059,873
SPINNING-TYPE FISHING REEL
Filed Dec. 9, 1960  4 Sheets-Sheet 1
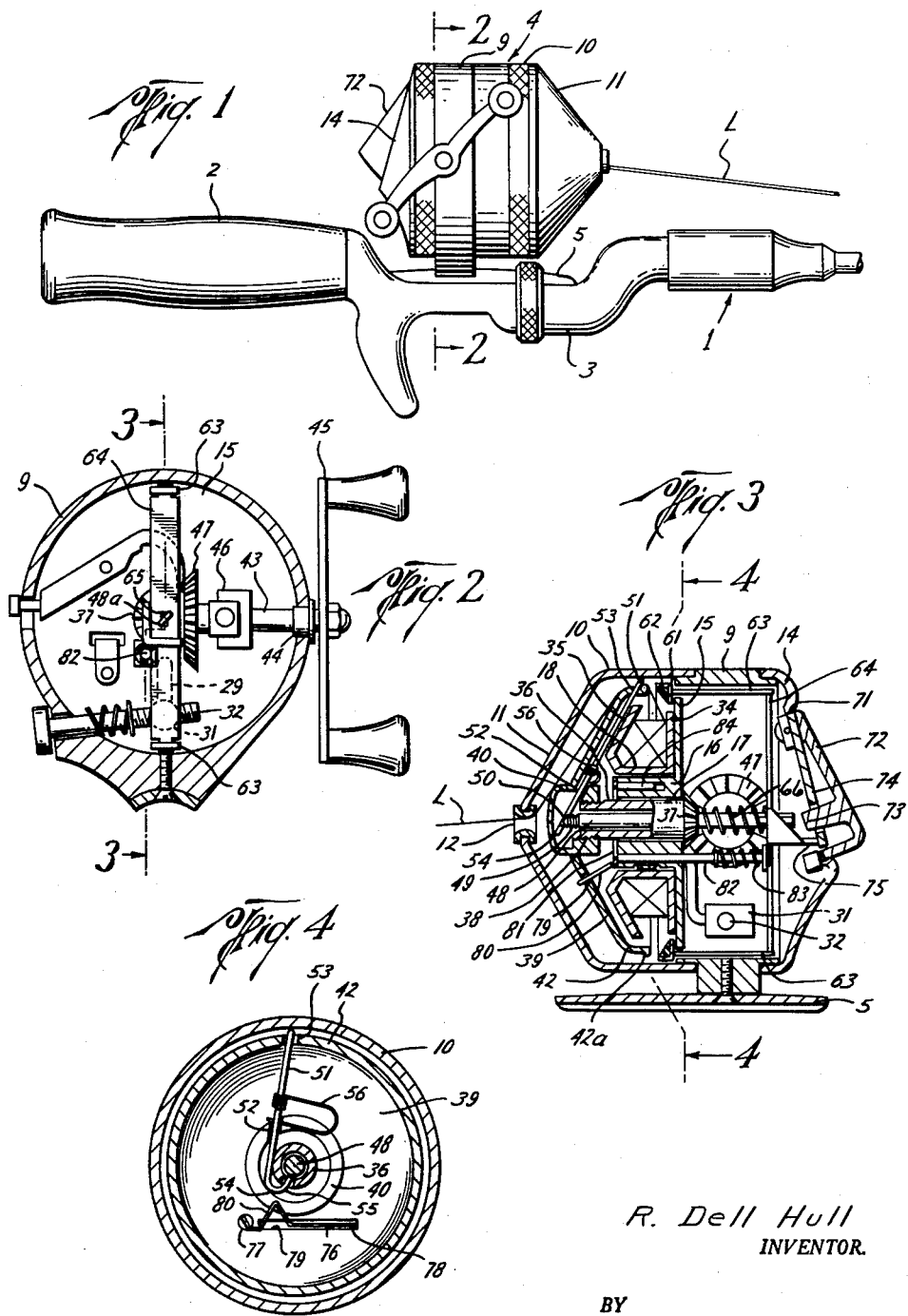
R. Dell Hull
INVENTOR.
BY
Pennie, Edwards, Morton, Barrows & Taylor
ATTORNEY

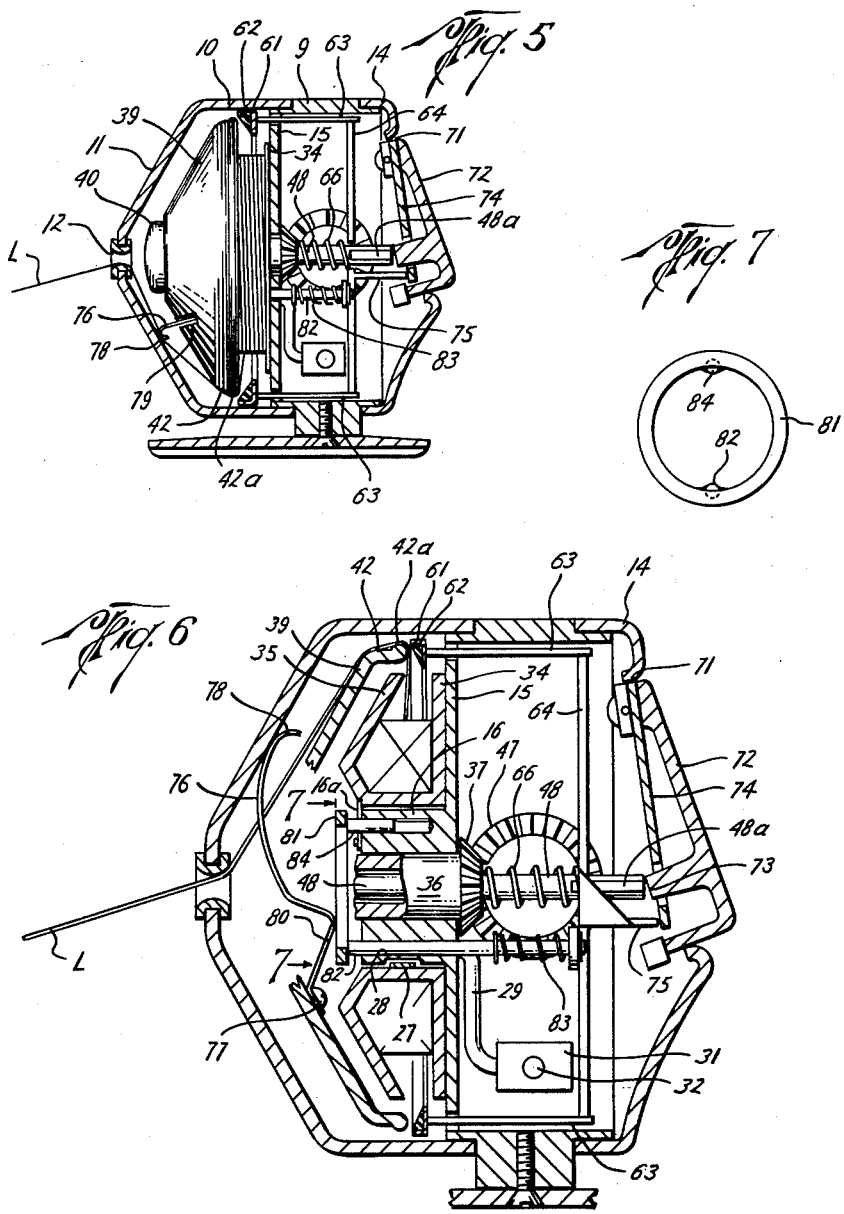

Oct. 23, 1962 R. DELL HULL 3,059,873
SPINNING-TYPE FISHING REEL
Filed Dec. 9, 1960 4 Sheets-Sheet 3
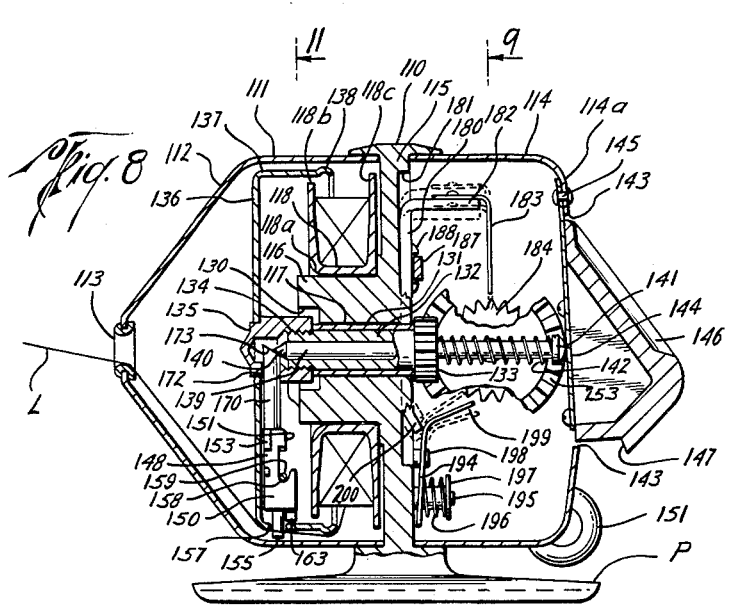
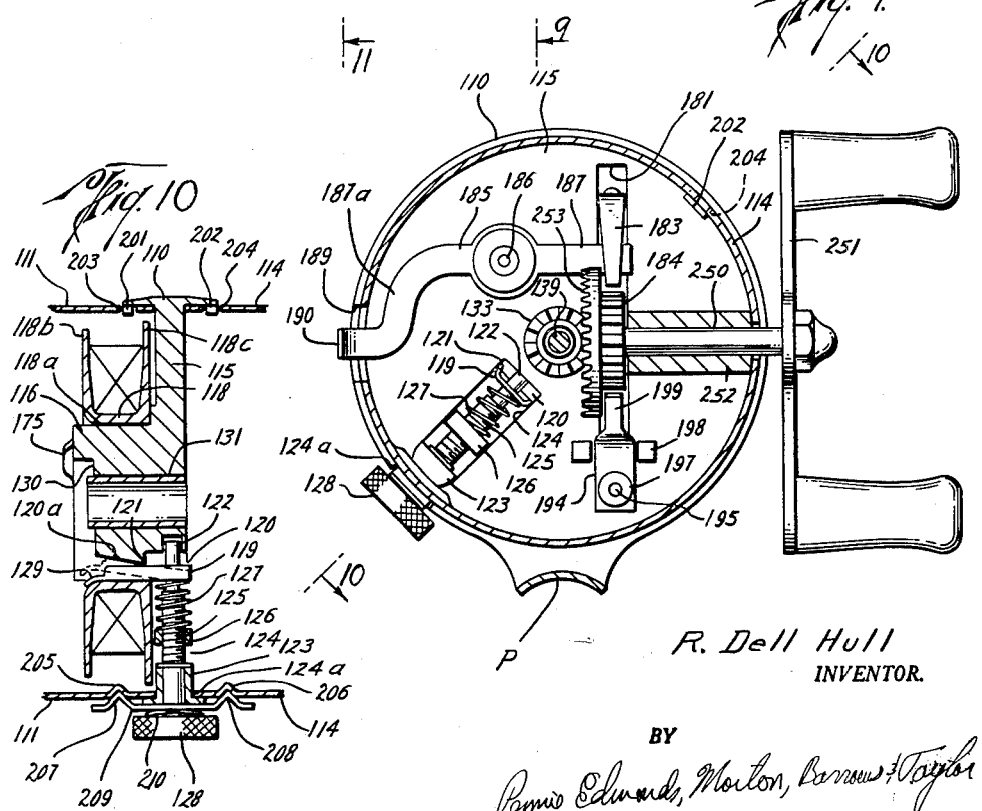
R. Dell Hull
INVENTOR.
BY
Pennie, Edmonds, Morton, Barrows & Taylor
ATTORNEY Oct. 23, 1962 R. DELL HULL 3,059,873
SPINNING-TYPE FISHING REEL
Filed Dec. 9, 1960 4 Sheets-Sheet 4
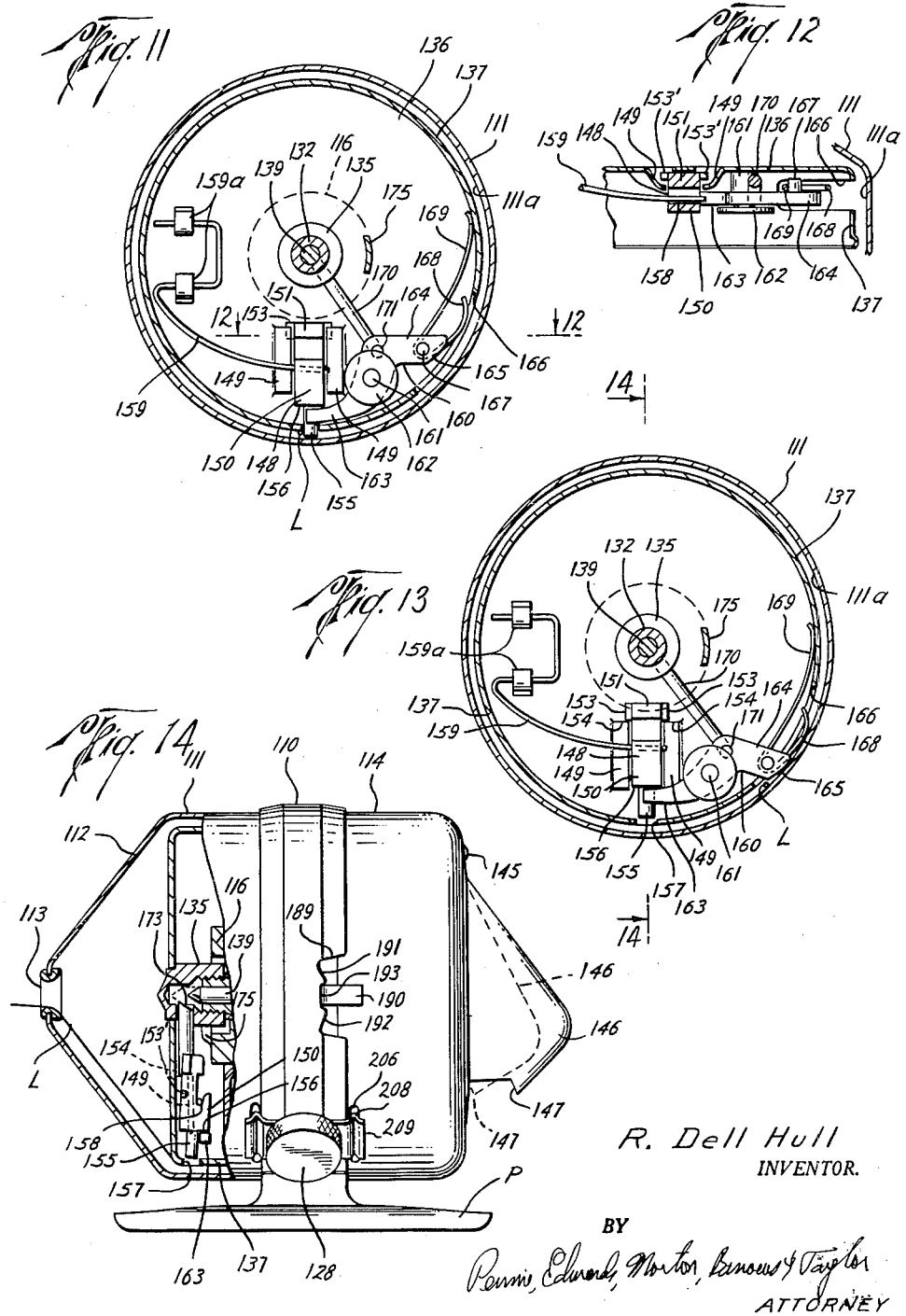
R. Dell Hull
INVENTOR.
BY
ATTORNEY

United States Patent Office 3,059,873
Patented Oct. 23, 1962

3,059,873
SPINNING-TYPE FISHING REEL
R. Dell Hull, 1131 E. Easton St., Tulsa, Okla.
Filed Dec. 9, 1960, Ser. No. 74,945
29 Claims. (Cl. 242—84.2)

This invention relates to fishing reels and, more particularly, to improvements in spinning reels.

The present invention is directed more particularly to improvements in spinning reels of the so-called "closed face" type. In this type of spinning reel, the line spool is enclosed within a casing normally provided with a front portion or cover, which may be of conical or concave form having a central opening or eye through which the line travels as it moves forwardly over the front face or flange of the line spool in passage to and from the spool, the line opening being ordinarily co-axial with the axis of the spool. Reels of this general type are illustrated in my U.S. Patents Nos. 2,668,025 and 2,675,192.

In spinning reels of the general type so described, a mechanism is ordinarily employed which is actuated by the thumb pressure of the user and is employed to grip the line immediately prior to casting, and to release the line as the cast is made. With such brake mechanisms, once the line has been released for the cast, no variable control may be exercised over the passage of the line, except that resulting from the force or momentum imparted to the lure by the cast. Any attempt to apply a braking force during the cast in these existing types of reels frequently causes the lure to be stopped abruptly, with consequent difficulty in controlling the accuracy of the cast. This is particularly true in using light lures and light lines, one of the most important advantages of spinning reel fishing being the ability to use very light lures and lines while attaining substantial distances in the cast.

The present invention has for its primary object, therefore, the provision of a novel type of auxiliary control mechanism by which the cast may be effectively controlled throughout its length by the operator.

More particularly, an object is to provide the operator with means for "feathering" the pull of the line as it is cast, whereby to exercise positive control over the extent of the cast adapted to assure maximum accuracy in placing the lure.

Another object is to provide an auxiliary brake or drag mechanism comprising a resilient drag element actuated by thumbing movements of the operator, which is operative to apply varying degrees of controlled friction to the line during a cast.

A more specific object is to provide a light spring finger or detent element which, in response to thumb pressure, is operable to apply a degree of resistance or drag thereto which is completely within the control of the operator and is operative to "feather" or controllably check the flight of the lure.

A further object is to provide an auxiliary "feathering" drag or brake operable in combination with the main brake means which is employed to hold the line before releasing it during the cast, the same thumb movements of the operator being employed to control both brake elements.

Other and more specific objects and advantages of this invention will become more readily apparent from the following detailed description when read in conjunction with the accompanying drawing which illustrates one useful embodiment of the improved reel structure in accordance with the present invention.

In the drawing:

FIG. 1 is an elevational view of a closed face spinning reel of the type herein contemplated, shown in position on a fishing rod;

FIG. 2 is a transverse cross-sectional view on line 2—2 of FIG. 1;

FIG. 3 is a longitudinal sectional view on line 3—3 of FIG. 2, showing the parts in positions occupied during re-winding;

FIG. 4 is a generally transverse cross-sectional view taken on line 4—4 of FIG. 3;

FIG. 5 is a view generally similar to FIG. 3, showing the parts in position while the "feathering" drag is being applied;

FIG. 6 is an enlarged view generally similar to FIG. 5, having some of the parts broken away to better illustrate the "feathering" drag of the mechanism;

FIG. 7 is a front view of one of the elements of the "feathering" drag mechanism as viewed from line 7—7 of FIG. 6;

FIG. 8 is a longitudinal sectional view of a second embodiment of the reel showing the parts in the positions occupied during rewinding;

FIG. 9 is a transverse cross-sectional view taken generally along line 9—9 of FIG. 8;

FIG. 10 is a cross-sectional view taken generally along line 10—10 of FIG. 9 showing the drag brake elements, some of the other parts of the reel being removed for purposes of clarity;

FIG. 11 is a transverse cross-sectional view taken generally along line 11—11 of FIG. 8;

FIG. 12 is a fragmentary view, partly in section, taken along line 12—12 of FIG. 11;

FIG. 13 is a view similar to FIG. 11, showing the parts in another position; and FIG. 14 is a view, partly in elevation and partly in longitudinal section, taken along line 14—14 of FIG. 13 and illustrating the position of the pick-up elements during a cast.

Referring to the drawing, and initially to FIGS. 1–7 thereof, the numeral 1 designates generally a fishing rod of any desired and generally conventional construction. This rod is provided with a handle portion 2 and further provided with a reel seat portion 3. The reel, designated generally by the numeral 4, is mounted on a supporting plate 5 adapted to be secured to the reel seat of the handle in a generally conventional manner, as shown.

Reel 4 comprises a tubular casing 9 constructed of any suitable material, such as metal, plastic, or the like, and is provided with a front cover 10 which fits snugly over the forward end of casing 9 and may be removed when desired. The forward portion of cover 10 is formed with a forwardly tapered conical portion 11 provided at its apex with a line guide opening 12 through which a line L may pass to and from the interior of the cover. A rear cover 14 fits snugly over the rear end of casing 9 and may be removed when desired. A wall 15 extends across the forward end of casing 9 and has formed in the center thereof a forwardly projecting tubular boss 16 having an axial bore 17. A line spool 18 is mounted on boss 16 and is arranged for controlled rotation about boss 16, as will be more fully described hereinafter. A pivoted keeper 16a (FIG. 6) serves to releasably lock the spool on boss 16.

Rotation of spool 18 about boss 16 is controlled by a drag brake mechanism of any suitable form which may be of the general form disclosed in my co-pending applications Serial No. 459,943, filed October 4, 1954, now U.S. Patent No. 2,915,258, or Serial No. 615,708 filed October 12, 1956, now abandoned in favor of my continuation application Serial No. 45,129, filed July 25, 1960, for example. This type of drag brake mechanism includes an arcuate resilient brake shoe 27, positioned in an annular groove 28 provided in the periphery of boss 16 and actuated by means of a brake lever 29 which, in the manner disclosed in the aforementioned application, is oscillatable by means of a crank 31 to vary the pressure of brake shoe 27 on the inner wall of spool 18. The position of crank 31 is controlled by means of a threaded adjustment rod 32 which extends through the wall of casing 9 (FIG. 2) and is threadedly inserted through crank 31.

Line spool 18 is provided with a rear or inner end flange 34 which seats against the forward face of wall 15 and has a circular front flange 35 axially spaced from the rear flange 34 and tapering rearwardly toward the latter, thereby having the forwardly projecting, generally frusto-conical form, as shown. A tubular shaft 36 extends axially through bore 17 and is rotatable therein and carries on its inner or rearward end a bevel gear 37 which is fixedly secured on the shaft and bears against the rear face of wall 15. The forward or outer end of shaft 36 extends in front of the forward end of spool 18 and is provided with external threads 38 adapted to threadedly receive a general circular pick-up head 39 of rearwardly tapering generally conical shape, substantially paralleling forward flange 35 of the line spool. Pick-up head 39 is formed with a hollow central hub 40 which is internally threaded for threaded engagement with threads 38 to thereby secure the pick-up head to the shaft. The outer periphery of pick-up head 39 is formed with a rearwardly extending flange 42 which projects over and rearwardly adjacent the outer periphery of spool flange 35, the inner edge of flange 42 being rounded, as at 42a (FIGS. 3, 5 and 6).

A crank shaft 43 (FIG. 2) is mounted in casing 9 at right angles to its longitudinal axis and projects radially through the wall of the casing through a bearing 44 and has mounted on its outer end a winding handle 45. The inner end of crank shaft 43 is journalled in support bearing 46 which is attached to wall 15. Crank shaft 43 carries on its inner end a bevel gear 47 which is in mesh with bevel gear 37 whereby rotation of crank shaft 43 will rotate shaft 36 and pick-up head 39. A cylindrical rod 48 extends slidably through the bore of shaft 36 and through the bevel gear 37 and projects rearwardly therefrom. The forward end of rod 48 extends into the bore of hub 40, as best seen in FIGS. 3 and 4, and is provided on its forward portion, just back of its forward end, with a short section of threads 49 of relatively coarse tapered form. The forward end of rod 48 is shaped to form a forwardly tapered conical surface 50. A line pick-up pin 51 is mounted for radial movement on the inner face of head 39, extending through a passage 52 in hub 40 aligned with an opening 53 in flange 42 (FIG. 3). The inner end of pin 51 is reversely bent upon itself to form a hook-shaped portion 54, having a bill portion 55 which is positioned for engagement with the threaded end of rod 48 (FIGS. 3 and 4). The end of bill portion 55 is tapered to form a pointed cam, which is cooperable with surface 50 and threads 49 to comprise means for projecting and retracting the outer end of pin 51 with respect to flange 42. A coil spring 56 has one end secured to pin 51 and the other bearing on hub 40 (FIGS. 3 and 4) so as to normally urge pin 51 outwardly through opening 53. This form of pick-up means is substantially the same as that described in greater detail in my aforementioned Patent No. 2,915,258.

Longitudinal movement of rod 48 and rotary movement of head 39 are employed to actuate pick-up pin 51 in the following manner: With rod 48 retracted to the position shown particularly in FIG. 3, pin 51 will be thrust radially outwardly through opening 53 under the urging of spring 56 and will be in position to engage the line L for re-winding the same on the spool. In this position, it will be seen that the cam and surface on bill portion 55 of the pick-up pin will be engaged by conical surface 50 on the forward end of rod 48. In order to retract pin 51 radially, the rod 48 is moved forwardly, in a manner to be described. The pointed or conical forward end 50 of the rod is thereby caused to act against the end of the bill portion 55, as a cam or wedge, to draw the pin 51 inwardly (downwardly as viewed in FIGS. 3 and 4) against the action of spring 56. Further forward movement of the rod 48 causes the threaded portion 49 of the rod to move past the end of the bill portion 55, the threads thereby becoming engaged with the bill portion to prevent rearward movement of the rod 48. This will serve to hold the pick-up pin in the retracted position, allowing line L to move freely across flange 42 and the periphery of the pick-up head, as during casting. When it is again desired to project the pick-up pin to engage the line for re-winding, head 39 will be rotated in the re-winding direction. This will rotate the head and pin 51 around rod 48 and will act to unscrew bill portion 55 from its engagement with threads 49, and thereby urge rod 48 relatively rearwardly of the bill portion in response to this unthreading movement until bill portion 55 has been completely released from its engagement with rod 48, whereupon spring 56 will project the pin outwardly to the position shown in FIG. 3.

The reel includes line control or brake mechanism of the general type disclosed in my U.S. Patent No. 2,675,192, and includes a ring-shaped brake member 61 mounted in front of wall 15 and provided on its forward face with a liner 62 composed of any suitable friction-creating material, such as rubber, plastic, or other composition material. Brake member 61 is radially and annularly dimensioned so that when moved forward it will annularly engage the rearward edge 42a of flange 42 and thereby clamp or brake the movements of line L passing to and from spool 18. A pair of diametrically spaced push rods 63—63 are secured to brake member 61 and project rearwardly through suitable openings in wall 15 and have their rearward ends secured to the opposite ends of a brake lever 64 which extends diametrically of casing 9. The center of brake lever 64 is provided with a rectangular opening 65 (FIG. 2) through which a flattened portion 48a, forming the rearward end of rod 48, extends slidably rearwardly of lever 64, whereby to hold rod 48 against rotation while permitting relative axial movement between the rod and the brake lever. The end of portion 48a may be twisted slightly, as shown, to prevent it from being pulled entirely out of lever 64. A coil spring 66 is mounted about rod 48 in compression between bevel gear 37 and brake lever 64 resiliently urging the latter and its connected brake member 61 rearwardly and, therefore, out of braking engagement with flange 42.

Rear cover plate 14 has an opening 71 therein (FIGS. 3, 5 and 6) in which is mounted a thumb pressure plate 72 which is swingably connected at its upper end to cover 14 in any suitable manner, so that it will swing freely through the cover. Thumb pressure plate 72 is provided, near its lower end, with an inwardly projecting boss 73 positioned to register with the rearward end of rod portion 48a, so that as the pressure plate is urged forwardly, it will urge rod 48 in the forward direction. A leaf spring 74 or other resilient element, is mounted inwardly of pressure plate 72 and has a portion extending below boss 73 positioned to resiliently engage a rearwardly extending lug 75 mounted on brake lever 64. Leaf spring 74 is positioned relative to boss 73 in such manner as to normally engage the end of projection 75 in advance of the engagement of boss 73 with the rearward end of rod portion 48a, this arrangement functioning to normally hold boss 73 out of contact with the end of portion 48a until sufficient pressure has been applied to thumb plate 72 to overcome resistance of leaf spring 74, this pressure, however, being effective to urge brake lever 64 forwardly slightly in advance of the contact of boss 73 with the end of portion 48a.

The "feathering" drag or auxiliary line control unit comprises a resilient finger 76 having one end secured to the inner face of pick-up head 39, as by means of the screw 77, the free end 78 of the finger being movable forwardly through a transverse slot 79 in head 39 toward the inner wall of front cover 10. A portion of the finger 76 interiorly of head 39 is bent inwardly to form a rearwardly extending projection 80 which acts as a support for the outer or active portion of the finger, this support being operative when thrust forwardly to urge the free end 78 of the finger 76 against the inner wall of front cover 10. To engage projection 80, there is provided in front of the forward end of boss 16 a ring-shaped thrust member 81 (FIGS. 6 and 7) which is connected to a thrust rod 82 reciprocably journalled in boss 16 and extends rearwardly through rear wall 15, the rearward end of rod 82 being fixedly secured to brake lever 64. A spring 83 is connected between thrust rod 82 and brake lever 64. Thrust ring 81 is guided and held against rotation by a guide pin 84 which extends slidably into the forward end of boss 16, as best seen in FIG. 6. With this arrangement, it will be seen that forward movement of brake lever 64 will urge thrust ring 81 forward; similarly, release of forward pressure on brake lever 64 will cause thrust ring 81 to retract.

The above described reel operates in the following manner: it will be assumed that a re-winding operation has just been completed. At this stage, the parts of the reel will be in the position as best seen in FIG. 3, in which it will be noted that bill portion 55 of the pick-up pin is riding on end surface 50 of rod 48 and the outer end of pick-up pin 51 is projected through flange 42 into engagement with line L, and that brake member 61 and brake lever 64 are in their rearwardly retracted positions under the urging of spring 66. Thrust ring 81 will likewise be retracted and out of engagement with projection 80 of the "feathering" finger, and also thumb pressure plate 72 will be in the normal relative outward position at which boss 73 will be out of contact with the end of rod portion 48a, all as shown in FIG. 3.

To prepare the reel for casting, the operator presses forwardly on thumb pressure plate 72. This forward movement of the thumb pressure plate causes leaf spring 74 to press against projection 75 urging brake lever 64 forwardly and moving brake member 61 into braking engagement with line L at the point where the latter passes over edge 42a of the pick-up of the pick-up head flange 42. Continued forward pressure on thumb plate 72 will urge boss 73 against the end of rod portion 48a and will thereby urge rod 48 forwardly, retracting pick-up pin 51 by causing bill portion 55 to engage threads 49, thereby locking the pick-up pin in a position out of engagement with line L.

Even though the pick-up pin is retracted, the line cannot unwind because it is clamped between the brake member 61 and the flange 42. As the cast is made pressure on the thumbing plate 72 is gradually released which permits brake lever 64 to retract from the flange 42 under the force of spring 66 and that of the resilience of lever 64, thereby releasing the line L which will begin to payout from the spool in response to the outward flight of the lure attached to the line.

As the line flows from the spool, the operator may, by appropriate thumbing of thumbing plate 72, apply pressure through leaf spring 74 to projection 75 and thereby urge thrust ring 81 forwardly under the thrust of rod 82 for a short distance before brake member 61 is advanced sufficiently forwardly to effectively clamp the out-flowing line against flange 42. The forward movement of thrust ring 81 will act through engagement with projection 80 to urge free end 78 of the spring finger against the inner wall of cover 10. As the line unwinds from the spool and passes through line guide 12, it will engage in a rotary or spiral unwinding movement about the outer face of pick-up head 39 and in doing so, will pass between the inner wall of cover 10 and the free end 78 of finger 76. By the thumbing movement applied through thrust ring 81, varying pressure may be thus applied to line L by thrusting it against the inner wall of cover 10 before the full braking force of brake member 61 is applied to line L as it passes over flange 42. A combination of the controlled thumb pressure and the resilience of finger 76 permits the operator to "feather" the drag on line L as it flows out through opening 12; thus, as the lure reaches the end and its travel under the force applied by the cast and the pulling force of the lure is attenuated, the pressure applied through "feathering" finger 76 can be modified by the user to accurately drop the lure at a selected spot.

By the "feathering" drag thus provided, it will be seen that the operator can maintain full control of the cast throughout its length and that the abrupt stopping of the lure, resulting from application of the brake member 61, is thereby avoided, since the "feathering" control will function prior to advance of brake member 61 to the braking position.

When it is desired to re-wind the line, handle 45 is turned in the re-winding direction, the resulting rotation of shaft 43 will act through the gear train, formed by bevel gears 47 and 37, to rotate pick-up head 39 around rod 48 to effect release of the pick-up pin, which will then be projected again into line-engaging position (FIG. 3), as previously described. Continued rotation of handle 45 in the re-winding direction will then serve to re-wind the line on spool 18 and when the re-winding has been completed, the reel will be ready for another casting operation.

Referring now to FIGS. 8-13 of the drawings illustrating a second embodiment of the invention, the reel shown comprises a generally tubular casing 110 constructed of any suitable material, such as metal, plastic, or the like, and is provided with a front cover 111 insertable in the forward end portion of casing 110 and removably secured thereto in a manner to be hereinafter described. Casing 110 is provided with the usual support plate P for attaching the reel to the reel seat of a fishing rod in the usual manner. The forward portion of cover 111 is formed with a forwardly tapered conical portion 112 provided at its apex with a line guide opening 113 through which line L may pass to and from the interior of the cover. A rear cover 114 fits into the rear end portion of casing 110 and is removably secured thereto in a manner to be described subsequently. A wall 115 extends across casing 110 and has formed in the center thereof a forwardly projecting cylindrical boss 116 having an axial bore 117. A line spool 118 having an axial bore 118a and forward and rear flanges 118b and 118c, respectively, is mounted on boss 116 in front of wall 115 and is arranged for controlled rotation about boss 116, as will be more fully described hereinafter.

Rotation of spool 118 about boss 116 is controlled by a drag brake mechanism, as best seen particularly in FIGS. 9 and 10. This drag mechanism comprises a brake shoe 119 which lies in a slot 120 (FIG. 10) provided in the periphery of boss 116 extending generally parallel to the axis of the boss and opening through the rearward face of wall 115. At an intermediate point in slot 120 the bottom of the slot is sloped at 120a toward the axis of the boss to thereby form the fulcrum or pivot 121 on which shoe 119 is rockable by means of a brake rod 122 which passes through the rearward end of the shoe. Rod 122 is disposed in a radial groove 124 which extends from the exterior of the casing into communication with slot 120. Rod 122 passes through a bushing 123 mounted in a radial opening 124a in the casing. An intermediate section 125 of rod 122 is externally threaded to receive a square nut 126 which is non-rotatably slidable in radial groove 124. A coil spring 127 is positioned about rod 122 in compression between nut 126 and shoe 119 whereby it will be seen that as rod 122 is rotated in one direction by means of the knurled head 128 mounted thereon externally of the casing, nut 126 will be advanced along threaded section 125 and will compress spring 127, thereby urging the outer end of shoe 119 about fulcrum 121 toward the bore wall of spool 118. The outer end of shoe 119 carries an outwardly curved toe 129 which is thus urged toward a similarly curved portion of the wall of bore 118a of spool 118 and the leverage thus applied to toe 129 intensifies the frictional engagement between the toe and the spool, thereby increasing the drag on the spool. Rotation of rod 122 in the reverse direction will release the spring pressure on the outer end of shoe 119, thereby allowing toe 129 to be slightly retracted from, or relieve its pressure on, the spool and thus reduce the drag or resistance to rotation of the spool. The retracted position of shoe 119 and toe 129 is indicated by the broken lines in FIG. 10.

In accordance with one aspect of the invention, the brake shoe 119, in addition to controlling rotation of the spool 118, functions in a further capacity, in that it serves to hold the spool against axial displacement on the boss 116. In this respect, the inner end of the shoe is locked against axial movement by the brake rod 122, and the shoe projects forwardly, through the bore of the spool. The forward or toe portion 129 of the shoe extends radially outward somewhat, engaging a limited portion of the front face of the spool, so that when the shoe is in its normal position as shown in FIG. 10, the spool 118 is releasably held against axial movement on the boss 116. Removal and replacement of the spool 118 may be readily accomplished by forcing the forward end of the shoe 119 radially inward, against the action of the spring 127, and, advantageously, the toe 129 is curved only slightly in an outward direction, so that the spool may be withdrawn by the application of axial force thereto sufficient to press the shoe 119 inwardly.

The forward end of bore 117 is counterbored for a short distance to provide the annular recess 130, and an anti-friction bearing 131 is disposed in bore 117 and projects slightly forwardly into recess 130, as best seen particularly in FIG. 8. A tubular shaft 132 is slidably inserted in the bore of bearing 131 and is rotatable therein and carries on its rearward end a pinion 133 which is fixedly secured on the shaft and bears against the rearward end of bearing 131, which forms a stop therefor. The forward end of shaft 132 extends in front of the end of boss 116 and is reduced in diameter and is externally threaded at 134 to threadedly receive the hollow hub 135 of a circular pick-up head 136 which is secured to hub 135 and has about its outer periphery an annular flange 137 which projects rearwardly over the outer periphery of spool flange 118b to a point intermediate the spool flanges. The inner end of hub 135 when screwed on threads 134 of the shaft will extend into recess 130 and abut the forward end of bearing 131 and thereby draw pinion 133 against the rearward end of bearing 132 and hold these parts together. The rearward end of flange 137 is rounded at 138 to permit smooth passage of line L thereover in its movement to and from spool 118.

A crank shaft 250 (FIG. 9) is mounted in casing 110 at right angles to its longitudinal axis and projects radially through the wall of the casing and has mounted on its outer end a winding handle 251. The inner end of crank shaft 250 is journaled in a support bearing 252 which is supported on the rear face of wall 115. Crank shaft 250 carries on its inner end a gear 253 which is in mesh with pinion 133, whereby rotation of crank shaft 250 will rotate shaft 132 and pick-up head 136.

A cylindrical control rod 139 extends slidably through the bore of shaft 132 and through pinion 133 and projects rearwardly from the latter. The forward end of rod 139 extends into the bore of hub 135, as best seen in FIGS. 8 and 14, and has its forward end shaped to provide the forwardly tapering conical tip 140. The rearwardly projection portion of control rod 139 extends to a point adjacent the rear wall 114a of rear cover 114 and has mounted on its rearward end a rounded head 141. A coil spring 142 is mounted about the rear portion of rod 139 and is disposed in compression between head 141 and pinion 133, thereby normally urging the control rod rearwardly in shaft 132. The rear wall 114a of cover 114 is provided with an opening 143 and a leaf spring 144 having its upper end secured to wall 114a above the upper edge of opening 143 by means such as rivet 145 depends into opening 143. The free portion of the leaf spring is adapted to be resiliently pressed against head 141 on the control rod by pressure applied through a thumb pressure plate 146 which is secuerd to the rear face of leaf spring 144 and is projectable therewith through opening 143. Thumb pressure plate 146 is provided with a shoulder 147 which is adapted to engage the lower edge of opening 143 to limit the inward movement of leaf spring 144. It will be understood that when pressure is applied to thumb plate 146 leaf spring 144 will push against head 141 to overcome the resistance of coil spring 142 and thus urge control rod 139 forwardly against the resistance of coil spring 142. When pressure is relieved from thumb pressure plate 146, the normal resilience of leaf spring 144 will cause the leaf spring to retract and permit coil spring 142 to urge control 139 to its rearward position, as best seen in FIG. 8.

The axial movements of control rod 139 are employed to actuate the line pick-up and line-feathering elements of the reel, best seen in FIG. 8 and FIGS. 11 to 14, inclusive. The line pick-up member includes a generally rectangular slide 148 disposed on the inner face of pick-up head 136 for axial sliding movement thereover between a pair of guide rails 149—149. The latter are spaced rearwardly relative to the inner face of head 136 (FIG. 12), being preferably formed by appropriately punching the metal forming the wall of head 136 and forcing the punched portions rearwardly to the position shown. Slide 148 has a maximum thickness, from front to rear, somewhat greater than the distance between the inner face of head 136 and the outer faces of rails 149, so that the body of slide 148 will project rearwardly beyond the outer surfaces of the rails. The thickness of slide 148 is reduced somewhat from its rearward face at a point intermediate its ends to form the relatively thick outer head 150 at the outer end of the slide and the relatively thick inner head 151 at the inner end of the slide. The latter is formed, or otherwise provided, with a pair of lugs 153—153 (FIGS. 12 and 13) extending laterally from opposite sides thereof adjacent the forward face of head 151. The front-to-rear thickness of lugs 153 is less than the distance between the inner face of head 136 and the inner surfaces of rails 149, as best seen in FIG. 12, and when slide 148 is seated against the inner surface of head 136, lug 153 will slide freely beneath rails 149. However, as best seen in FIGS. 12 and 13, when the inner head 151 of the slide is moved longitudinally inwardly past the inner ends of rails 149 and head 151 is then raised rearwardly with respect to the inner surface of head 136, the outer ends of lugs 153 are adapted to engage the inner ends 154 of rails 149 and limit outward longitudinal movement of the slide between the rails, for purposes to be more fully described subsequently. The outer end of slide 148 carries a cylindrical pick-up pin 155 which is smaller in area than the end of outer head 150, to thereby form an outwardly facing shoulder 156 about the inner end of pin 155. The latter is positioned for registration with an opening 157 provided through flange 137 and is adapted to be projected and retracted through opening 157 by corresponding movements of slide 148. The inner end of outer head 150 is undercut to provide the transverse notch 158 (FIGS. 8 and 14) which is adapted to receive the free end of a wire spring 159, the opposite end of which is suitably anchored to the inner face of head 136 by means of the clamps 159a. The spring 159 is formed and positioned so that its free end will normally tend to occupy a position spaced rearwardly from the inner face of head 136 and, therefore, when the free end of spring 159 is seated in notch 158, the pressure exerted by the spring will act both to urge slide 48 radially outwardly between rails 149—149 and to lift the inner end of slide 148 rearwardly away from the inner face of head 136, as best seen in FIG. 14. With this arrangement it will be seen that when the slide is moved inwardly spring 159 will lift inner head 151 away from the inner face of head 136 and cause the outer ends of lugs 153 to abut against the inner ends 154 of rails 149, thus locking the slide in its inward position and pick-up pin 155 in its retracted position (FIGS. 13 and 14). Small auxiliary lugs 153' projecting laterally from the slide 148, intermediate its ends, engage the forward surfaces of the rails 149 to limit the extent of rearward movement of the slide. The auxiliary lugs 153' are of less thickness than the end lugs 153 (FIG. 14) so that at least portions of the lugs 153 overlie the ends of rails 149 when the slide 148 is moved to its limit position away from the inner face of the pick-up head 136. When inner head 151 is thrust forwardly toward the rearward face of head 136, lugs 153 will drop beneath rails 149 and the force of spring 159 will then urge slide 148 and pick-up pin 155 to the projected position of the latter (FIGS. 8 and 11).

The mechanism employed to retract and release slide 148, for retracting and projecting pick-up pin 155, is also best seen in FIGS. 11 to 14. This mechanism comprises a bell crank 160 pivotally mounted on the rearward face of head 136 on the pivot pin 161 and secured to the head by means of the washer 162 which is riveted to the outer end of the pivot pin. One arm 163 of the lever is positioned to engage shoulder 156 on the outer end of the slide and rearwardly of pick-up pin 155 so that when the lever is swung in a direction to move arm 163 inwardly it will thrust against shoulder 156 and urge slide 148 inwardly, thereby retracting pick-up pin 155, as best seen in FIGS. 13 and 14. By positioning arm 163 rearwardly of pick-up pin 155, as shown, the lever arm serves to confine the outer end of the slide 148 against dislodgment from between the guide rails 149. The other arm 164 of lever 160 is provided at its outer end with a cam surface 165 which is projectable through a slot 166 provided in flange 137. Arm 164 carries a forwardly projecting lug 167 about which is bent a wire spring to provide a short leg 168 and a long leg 169. The spring 168, 169 is fixed to the arm 164 and/or lug 167, whereby the separate legs 168 and 169 form, in effect, individual spring elements. Short leg 168 is outwardly curved and is arranged to be projected through slot 166 slightly in advance of the cam end 165 of the arm as the latter swings outwardly and to engage the inner surface 111a of front cover 111 in advance of cam end 165 to thereby form a resilient yieldable barrier to the passage of line L between the flange 137 and surface 111a as the line unwinds from spool 118 in passage from the reel. This shorter spring arm 168 comprises the controllable feathering device for yieldably squeezing or pressing line L against inner surface 111a, and thereby provides a relative sensitive control for the movement of the line from the reel. FIG. 13 illustrates arm 164 moved outwardly of slot 166 to a position at which cam end 165 is placed in direct engagement with surface 111a, to thereby provide a nonyieldable positive stop for line L. At any position of cam end 165 prior to this direct engagement with surface 111a, spring arm 168 will constitute the only barrier to the movement of line L and the extent of which arm 168 is forced against surface 111a will determine the pressure placed on line L in effecting control of its movement. Longer spring arm 169 has its free end bearing against the inner surface of flange 137 and its arrangement is such as to normally urge lever arm 164 to the retracted position (FIG. 11), thereby urging lever arm 163 outwardly and resiliently resisting its inward movement. Lever 160 is swung about pivot 161 by means of a crank rod 170 which has its outer end pivotally connected at 171 to lever 160 and has its inner end projecting through an opening 172 in the wall of hub 135 into a position wherein its inner end may be engaged by tip 140 of control rod 139. The inner end of push rod 170 is cut at an angle to form the sloping cam surface 173, which is engageable by tip 140.

Longitudinal movement of control rod 139 and rotary movement of head 136 are employed to actuate pick-up pin 155 in the following manner: With rod 139 retracted to the position shown particularly in FIG. 8, pin 155 will be thrust radially outwardly through opening 157 under the urging of spring 159 and will be in position to engage line L for rewinding the same on the spool. In this position, it will be seen that tip 140 is retracted substantially relative to surface 173 on the end of crank rod 170, so that the latter will be in its relatively retracted position, in which position arm 163 will be swung outwardly and arm 164 inwardly substantially as shown in FIG. 11. In order to now retract pin 155 to release the line for casting, control rod 139 will be thrust forward by pressure applied to thumb pressure plate 146, acting through leaf spring 144 against head 141 and overcoming the resistance of coil spring 142. Tip 140 on the end of the control rod will thus be pushed into engagement with surface 173 (broken lines FIG. 14) on the crank rod and will urge the latter outwardly, thereby swinging arm 163 inwardly against shoulder 156 and thrusting slide 148 inwardly until lugs 153 clear the inner ends 154 of rails 149, whereupon the pressure of spring 159 will lift lugs 153 into engagement with the inner ends of rails 149 and lock slide 148 in its inner position and thereby retracting pick-up pin 155 to the position shown in FIG. 13. Simultaneously, arm 164 of the bell crank lever will be thrust outwardly through slot 166 and cam end 165 will act to engage line L and prevent its withdrawal from the reel while the thumb pressure continues to be applied to plate 146. The reel is now ready for the cast, whereupon thumb pressure is relieved from control rod 139, which is retracted under the pressure of spring 142 thereby relieving the outward pressure on crank rod 170, and this, in turn, will permit the pressure of longer spring arm 169 on the inner face of flange 137 to pull lever arm 164 inwardly and release line L as the lure is cast. Line L will then spin off of the spool and will pass over feathering spring 168, the pressure of which can now be regulated by lightly varying the thumb pressure on plate 146 which will move control rod 139 into correspondingly varying degrees of engagement with the cam end of crank rod 170 and correspondingly vary the pressure applied through lever arm 164 to feathering spring 168. Since slide 148 will be held in its retracted position by engagement of lugs 153 with the inner ends of rails 149, the movement of lever arm 163 produced by the described feathering movements of lever arm 164 will not have any effect on slide 148. If it is desired to completely stop further outward movement of line L, the pressure applied to thumb plate 146 may be increased sufficiently to force cam end 165 into direct engagement with surface 111a. Thus, it will be seen that complete and delicate control of the line during the cast may be effected.

When it is desired to retrieve the line, handle 251 will be turned to rotate shaft 250 in the retrieving direction and the latter will, of course, rotate pick-up head 136. As the latter rotates, the rearward face of inner head 151 on the pick-up pin slide will come in contact with a cam lug 175 which projects forwardly from the forward end of boss 116 and is positioned in the path of rotary movement of inner head 151 when the latter is in its retracted position, as best seen in FIGS. 13 and 14. As head 151 engages cam 175, the latter will provide forward thrust against head 151 and push the latter forwardly so that lugs 153 will be pushed away from the ends of rails 149 to the position illustrated in FIG. 12, whereupon the pressure of spring 159 will act to thrust the slide outwardly and project pick-up pin 155 to its pick-up position. Continued rotation of handle 251 will reel in the line and wind it back on spool 118. At this stage of operations, control rod 139 will continue to remain in its retracted position; hence, no pressure will be exerted against crank rod 170 and thus there will be no pressure on arm 163 which would tend to resist the outward movement of slide 148. When retrieving of the line has been completed, the reel is ready for application of thumb pressure to retract the pick-up pin and release the line for another cast, as previously described.

The reel herein described also includes improved antireverse and click mechanisms which are best seen in FIGS. 8 and 9. The click structure comprises an elongate flat bar 180 slidably mounted in a correspondingly shaped groove 181 cut or formed vertically in the rear face of wall 115. Bar 180 has its upper end turned outwardly or rearwardly to form the arm 182 to which is connected the reversely directed resilient click finger 183, the point of which extends downwardly substantially parallel to bar 180 and is adapted to be moved into and out of engagement with the teeth of a sprocket 184 which is fixed to shaft 250 behind gear 253. A flat lever 185 is pivoted to the rear face of wall 115 at 186 and has one arm 187 extending over the upper surface of bar 180 between a pair of opposing lugs 188 mounted on the upper surface of bar 180. The other arm 187a of lever 185 projects through a slot 189 in the wall of casing 110 to the exterior of the casing and is provided with a knob 190 by which the lever is moved angularly along slot 189 between three positions defined by the notches 191, 192 and 193 (FIG. 14) formed in the bottom of the slot. As shown in full lines in FIGS. 8, 9 and 14, lever 185 is in the neutral position when seated in notch 193. In this position, the free end of click finger 183 will be retracted out of contact with the teeth of sprocket 184 and thus no sound will be produced by rotation of the gears and other rotatable parts of the reel.

The antireverse elements comprise the spring pawl 194 having one end loosely secured to a post 195 mounted on the rear face of wall 115 and urged toward the wall by a coil spring 196 positioned about post 195 between a head washer 197 and the end of pawl 194. The loose fitting connection between the end of pawl 194 and post 195 permits the free end of the pawl to be moved outwardly and inwardly with respect to the rear face of wall 115 between a pair of guide blocks 198 mounted on opposite sides of slot 181 with which the pawl is aligned. The free end of the pawl has an upwardly turned spring finger 199 engageable with the teeth of sprocket 184 when the pawl is moved a sufficient distance inwardly toward wall 115. To accomplish such inward movement the lower end of bar 180 is provided with an up-turned toe 200 which, in the neutral position shown in full lines in FIGS. 8 and 9, will be sufficiently advanced to engage beneath pawl 194 (FIG. 8) and lift pawl finger 199 to a retracted position out of the path of rotation of the teeth of sprocket 184 in opposition to the pressure imposed by spring 196. When it is desired to engage click finger 183 with the sprocket, lever 185 will be moved to the position at which its outer arm 187a will be received in notch 191, thereby moving bar 180 and its attached parts downwardly to the broken line position shown below the full lines in FIG. 8. This downward movement of bar 180 will not only cause click finger 183 to engage teeth of sprocket 184 thereby producing the desired clicking sound upon rotation of the gears, as previously noted, but will also thrust toe 200 farther beneath pawl 194 and additionally urge finger 199 farther away from engagement with the teeth of sprocket 184, as shown in the broken line below finger 199 in FIG. 8. In this position the operating handle may be rotated in either direction and will produce the clicking sound since click finger 183 only will engage the sprocket teeth.

To engage the antireverse pawl, the lever 185 is swung in the opposite direction so that lever arm 187a will be seated in notch 192, which will act through arm 187 to move bar 180 upwardly to the broken line position shown above the solid line position in FIG. 8 and will, at the same time, correspondingly retract toe 200 from beneath pawl 194 allowing finger 199 to be moved under the pressure of spring 196 to a position where the end of the finger will engage the teeth of sprocket 184 and prevent rotation of the sprocket in a direction opposed by the finger, thereby preventing rotation of head 136 in the reverse direction, that is, the direction which would permit the line to be drawn off the spool. Finger 199 will, however, permit rotation in the direction for picking up the line. With the click and antireverse arrangement described, it will be seen that these elements may be actuated by simple movement of lever 185 to one of three positions readily accessible to the operator, and easily operated.

The reel also includes improved means providing easily securable and releasable connections for the front and rear covers to casing 110, as best seen in FIGS. 9 and 10. These means comprise inwardly extending lugs 201 and 202 at oppositely disposed points on the forward and rearward edges, respectively, of casing 110, these lugs being receivable in correspondingly shaped notches or openings 203 and 204, respectively, adjacent the inner margins of the front and rear covers. The engagement of the lugs in the notches is such as to form simple hinge connections about which the covers may be swung into and out of inserted positions inside the forward and rear ends of casing 110. Diametrically opposite openings 203 and 204, the covers are provided with depressions or recesses 205 and 206, respectively, which are adapted to receive frictionally engaging lugs 207 and 208, respectively, carried at the opposite ends of a spring clip 209 which is secured exteriorly of the casing about the outer end of brake rod 122 and extends longitudinally of the casing beyond the forward and rear edges thereof, so that the lugs 207 and 208 may drop into notches 205 and 206 as the inner edges of the covers are pushed past the lugs in movement to seating positions inside the ends of the casing. A spring 210 is disposed between head 128 of the brake rod and the outer face of clip 209 to apply spring pressure to the clip to thereby press the lugs into the notches and resiliently but firmly hold the covers in place. When it is desired to remove the covers the portions underlying lugs 207 and 208 are simply pulled outwardly with sufficient force to overcome the grip of the lugs and thereby draw them out from under the lugs. The covers may then be swung about the hinges formed by lugs 201 and 202 and notches 203 and 204 and after clearing the clips the covers may be pulled off of the hinge lugs and removed from the casing. The foregoing thus provides means whereby the covers may be easily attached and snapped into place in the ends of the casing and will be held firmly in place until necessary to remove them, as described.

From the foregoing description, it will be seen that a spinning reel construction is provided by which the user may conduct spinning reel casting by means of the same movements ordinarily employed in conventional casting reels and by which the user will be able to maintain complete control over the cast throughout its entire extent, so as to assure maximum accuracy in the placing of the lure. While the preferred form of the invention has been described, it will be understood that modifications therein within the scope of the appended claims may be made without departing from the spirit of this invention.

This application is a continuation-in-part of my copending application Serial No. 602,567, filed August 7, 1956, and contains the subject matter of copending application Serial No. 680,501, filed August 27, 1957, both of said prior applications now being abandoned.

I claim:

1. A spinning type fishing reel comprising a tubular casing, an end member for said casing and having a line guide aperture therein, a line-carrying spool mounted in said casing, a line pickup disc rotatably mounted in spaced relation to said end member between said spool and said end member and having an annular peripheral portion extending radially beyond the periphery of the spool, said pickup disc also having therein a through slot, a curvilinear spring member fixed at one end to said disc and having a curved portion adjacent said fixed end positioned on the spool side of said disc and a line impeding portion beyond said curved portion extending through said slot and into the space between the disc and the end member, an annular brake member mounted in the casing and surrounding said spool and being axially reciprocable relative to and engageable with said annular portion of said disc, a thrust shaft reciprocably mounted parallel to the axis of said casing and having on the disc end thereof a thrust surface adapted to engage the curved portion of said spring member and to displace said spring member to cause said line impeding portion to bear separably against said end member upon said thrust surface being moved toward said end member, and means operable externally of said casing for moving said thrust shaft toward said end member and said brake member toward said annular portion of said disc such that the spring member bears on the end member before the brake member engages the annular portion of the disc.

2. A spinning type fishing reel comprising a tubular casing, an end member for said casing and having a line guide aperture therein, a line-carrying spool mounted in said casing, a line pickup disc rotatably mounted in spaced relation to said end member between said spool and said end member and having an annular peripheral portion extending radially beyond the periphery of the spool, said pickup disc also having therein a through slot, a curvilinear spring member fixed at one end to said disc and having a curved portion adjacent said fixed end positioned on the spool side of said disc and a line impeding portion beyond said curved portion extending through said slot and into the space between the disc and the end member, a thrust shaft reciprocably mounted parallel to the axis of said casing and carrying on the disc end thereof a thrust surface adapted to engage the curved portion of said spring member and to displace said spring member to cause said line impeding portion to bear separably against said end member upon said thrust surface being moved toward said end member, and means operable externally of said casing for moving said thrust shaft toward said end member.

3. A spinning type fishing reel comprising a tubular casing having a forward wall with a central line guide aperture therein, a line carrying spool mounted in said casing and adapted to be non-rotatable during times when a line is withdrawn from said spool through said line guide aperture, said line carrying spool having a forward wall spaced from said casing forward wall, a resilient deflectable member supported adjacent one of said forward walls and projectable toward the other of said forward walls at a point spaced radially from said aperture, and manually actuable means for urging said deflectable member toward said other forward wall, wherein portions of the length of the line upwinding from said spool and paying out through said line guide aperture traverse the space between said forward walls by revolving about the axis of the aperture and the paying out of line is intermittently impeded by said deflectable member intercepting the revolving portion of said line when said deflectable means is urged toward said other forward wall.

4. A spinning type reel according to claim 3, in which a line pick-up member is mounted between said spool and casing forward walls, one of said line spool and pick-up members is rotatable for retrieving line, and said deflectable member is mounted on said pick-up member.

5. A spinning type reel according to claim 3, in which said deflectable member is a spring wire mounted at one end and projectable into the space between said forward walls, said wire having a portion disposed at an angle to said forward walls and adapted to project toward said other forward wall in the general direction of revolving movement of said line about said aperture during withdrawal of line from said spool, the arrangement being such that said line is urged lightly toward said other forward wall at least once during each revolution of the line about said aperture when said deflectable member is projected toward said other forward wall.

6. A spinning type reel according to claim 5, in which a line brake is operated by said manually actuable member, said manually actuable member being operative upon limited movement thereof to project said deflectable member into line impeding position and upon further movement thereof to render said line brake effective for preventing further withdrawal of line from said spool.

7. A spinning type fishing reel comprising a casing, an end member for said casing and having a line guide aperture therein, a line-carrying spool mounted within said casing, a line pickup disc rotatably mounted between said end member and said spool and spaced from said end member, and a resilient means displaceably bridging the spacing between said end member and said disc, said resilient means comprising a spring wire fixed at one end to said pick-up disc and extending therefrom across the spacing between the disc and the end member to bear separably against the end member, the arrangement being such that portions of the length of the line unwinding from said spool and paying out through said line guide aperture traverse the space between the disc and the end member by revolving about the axis of the aperture and the paying out of the line is intermittently impeded by said resilient means intercepting the revolving portion thereof.

8. A spinning type fishing reel comprising a casing, an end member for said casing and having a line guide aperture therein, a line-carrying spool mounted within said casing, a line pickup disc rotatably mounted between said end member and said spool and spaced from said end member, said disc being provided with a slot therein, and a resilient means displaceably bridging the spacing between said end member and said disc, said resilient means comprising a curvilinear spring which is fixed at one end to said disc and has a curved portion intermediate the ends positioned in said slot to maintain the alignment of the spring, the arrangement being such that portions of the length of the line unwinding from said spool and paying out through said line guide aperture traverse the space between the disc and the end member by revolving about the axis of the aperture and the paying out of the line is intermittently impeded by said resilient means intercepting the revolving portion thereof.

9. A spinning type fishing reel comprising a casing, an end member for said casing and having a line guide aperture therein, a line-carrying spool mounted within said casing, a line pickup disc rotatably mounted between said end member and said spool and spaced from said end member, said disc being provided with a through slot, a resilient means displaceably bridging the spacing between said end member and said disc, said resilient means comprising a curvilinear spring which is fixed at one end to said disc and has a curved portion positioned on the spool side of said disc and extending through said slot, and a thrust member movably mounted adjacent said curved portion of the spring and controllable by means external of said casing, said thrust member being adapted in response to activation of said external means to bear against said curved portion of the spring and to displace said spring so that another portion thereof bridges the space between the disc and the end member, the arrangement being such that portions of the length of the line unwinding from said spool and paying out through said line guide aperture traverse the space between the disc and the end member by revolving about the axis of the aperture and the paying out of the line is intermittently impeded by said resilient means intercepting the revolving portion thereof.

10. A spinning type fishing reel according to claim 9 in which a portion of said spring adjacent the free end thereof is made to bear separably against said end member when said spring is displaced in response to actuation of said external means.

11. A spinning type fishing reel according to claim 9 in which a portion of said spring adjacent the free end thereof is made to bear separably against said end member and in which the bearing force exerted by said spring portion on said end member is variable in response to actuation of said external means.

12. A spinning type fishing reel comprising a casing, a line carrying spool mounted in said casing and adapted to be nonrotatable during times when a line is withdrawn from said spool, said casing and spool having an axis, said line being revolvable about said axis when paying out from said reel, a member having a portion projectable into the path of revolution of said line at a point spaced radially of said axis for intercepting revolving segments of said line, manually operable means for selectively projecting said member into said path, and resilient support means for said portion, the resiliency of said support means being such that said portion is adapted to be resiliently deflectable by revolving segments of said line whereby the line will be intermittently slowed down during the paying out of the line.

13. A fishing reel comprising, a line carrying spool mounted in said reel to be normally non-rotatable during times when a line is withdrawn from said spool, said spool having an axis, said line being revolvable about said axis when paying out from said reel, a member having a portion projectable into the path of said line at a point spaced radially of said axis for intercepting revolving segments of said line, manually operable means for selectively projecting said member into said path and resilient supporting means for said portion, the resiliency of said supporting means being such that said portion is resiliently deflected by revolving segments of said line to cause intermittent slowing down of the line during the paying out thereof.

14. A fishing reel comprising, a line carrying spool mounted in said reel to be normally non-rotatable during times when a line is withdrawn from said spool, said spool having an axis, said line being revolvable about said axis, when paying out from said reel, a member having a portion projectable into the path of said line at a point spaced radially of said axis for intercepting revolving segments of said line, manually operable means for selectively projecting said member into said path and supporting means for said portion, one of said portion and said supporting means being resilient, such that said member is resiliently deflectable by revolving segments of said line to cause intermittent slowing down of said line during the paying out thereof.

15. A spinning type fishing reel comprising a casing, a line carrying spool mounted in said casing and adapted to be non-rotatable during times when a line is withdrawn from said spool, said casing and spool having an axis, said line being revolvable about said axis when paying out from said reel, a member having a portion projectable into the path of revolution of said line at a point spaced radially of said axis for intercepting revolving segments of said line, manually operable means for selectively projecting said member into said path, and support means for said portion, one of said portion and said support means being resilient such that said member is adapted to be resiliently deflectable by revolving segments of said line whereby the line will be intermittently slowed down during the paying out of the line.

16. In a spinning reel of the type having a frame, a line spool mounted on the frame, a casing surrounding at least portions of said frame and defining in part a path for movement of line during revolvable pay-out thereof from said spool, positive brake means for preventing the flow of line from said line spool, and feathering means for controlling the flow of line from said line spool, the improvement in said brake and feathering means characterized by said brake means comprising a brake member mounted on said reel and movable into the path through which said line passes and thereby intercepting and non-yieldably obstructing the line flowing from the spool, said feathering means comprising a spring element movable toward a wall portion of said casing into varying degrees of interference with the free flow of line from said spool and through said path, and a single movable control means operatively connected to said brake and feathering means and operative upon full movement to move said brake means into said line intercepting position and upon partial retracting movement following said full movement to retract said brake means and position said feathering means in the line interfering relation.

17. The reel of claim 16, in which the spring element is mounted on said brake member for movement therewith, said spring member being positioned to move into said line interfering relation upon partial movement of said brake member toward said line intercepting position.

18. The reel of claim 16, in which the front cover surrounds the line spool and defines therewith an annular space for the flow of line from the spool, said brake member comprises a rigid member normally positioned substantially within the peripheral outlines of the line spool and adapted to be projected into contact with surrounding portions of said cover to obstruct said annular space, and said spring element is movable with variable force into contact with surrounding portions of said cover.

19. The reel of claim 16, which includes a pick-up member rotatably mounted forwardly of said line spool and having retractible pick-up pin, and said pick-up pin is operatively connected to said control means whereby said pick-up pin is retracted upon movement of said brake member into line intercepting position.

20. The reel of claim 19, in which the brake member comprises a lever pivotally mounted on said pick-up head and having one end portion adapted to be projected beyond the periphery thereof into said line intercepting position, and the other end of the lever acts upon the pick-up pin for retracting the pin upon movement of said one end portion toward said line intercepting position.

21. The reel of claim 16, in which said brake member is mounted for pivoting movement and carries a pair of spring legs adjacent one end, one of the spring legs constitutes the feathering spring element, and the other of the spring legs is positioned adjacent and acts against a part of said reel to urge the brake member out of line intercepting relation.

22. A spinning reel comprising a frame, a line spool mounted on said frame and forming a central core about which line revolves during pay-out thereof, a brake member movable into the revolving path of said line to a position completely intercepting and non-yieldably obstructing the revolving movement thereof, a resilient feathering member projectable into said revolving path to positions of varying degrees of interference with the revolving movement of the line, and a single manual control member operatively connected to said brake and feathering members and operative, when manually actuated in one direction, to move said feathering and brake members into their respective line interfering and line intercepting positions in sequence.

23. The spinning reel of claim 22, in which said brake member is a substantially rigid member, and said feathering member is a spring element mounted on said rigid brake member.

24. The reel of claim 23, in which said brake member and spring element are mounted generally within the peripheral limits of said spool and are projectable radially outward by said control member, said spring element projecting radially outward from said brake member.

25. The reel of claim 24, which includes a braking surface spaced radially outward of the revolving path of said line, said surface being engaged by said spring element and said rigid brake member in sequence upon radially outward movement of said brake member.

26. The spinning reel of claim 22, which includes a pick-up head mounted on said frame for rotation with respect to said spool, said brake member and feathering member being mounted on said pick-up head.

27. The spinning reel of claim 26, in which said control means comprises a control rod mounted for axial movement in said reel and having a cam portion at its forward end, and which includes an actuating rod connected to said brake and feathering members and movable by said cam portion.

28. The spinning reel of claim 27, in which a pick-up pin is mounted in said pick-up head for movement into and out of operative position projecting from said pick-up head, and a lever is pivoted on said pick-up head and connects said pick-up pin and actuating rod on opposite sides of its pivot axis, whereby outward movement of said actuating rod effects inward movement of said pick-up pin.

29. The spinning reel of claim 28, in which said brake member comprises an end portion of said lever, said end portion being on the same side of said pivot axis as said actuating rod.

References Cited in the file of this patent

UNITED STATES PATENTS

| | | |
|---|---|---|
| 2,602,603 | Blissit | July 8, 1952 |
| 2,644,647 | Denison et al. | July 7, 1953 |
| 2,675,192 | Hull | Apr. 13, 1954 |
| 2,862,679 | Denison et al. | Dec. 2, 1958 |